US006902177B2

(12) United States Patent
Lindsay et al.

(10) Patent No.: US 6,902,177 B2
(45) Date of Patent: Jun. 7, 2005

(54) MOBILITY ASSISTANCE VEHICLE

(75) Inventors: Stuart M. Lindsay, Burlington, VT (US); David Winters McMath, Hinesburg, VT (US); Robert Cowles, Shelburne, VT (US); Timothy C. Mathewson, Ferrisburgh, VT (US)

(73) Assignee: Kudhara, Inc., Hinesburg, VT (US)

( * ) Notice: Subject to any disclaimer, the term of this patent is extended or adjusted under 35 U.S.C. 154(b) by 0 days.

(21) Appl. No.: 10/459,153

(22) Filed: Jun. 11, 2003

(65) Prior Publication Data

US 2004/0251655 A1 Dec. 16, 2004

(51) Int. Cl.⁷ .............................................. B62K 5/00
(52) U.S. Cl. ....................................................... 280/282
(58) Field of Search ................................ 280/282, 235, 280/266, 236, 237, 263, 249, 250, 271

(56) References Cited

U.S. PATENT DOCUMENTS

| 85,501 A | 12/1868 | Wood |
| 252,455 A | 1/1882 | Giles |
| 329,755 A | 11/1885 | McIntosh |
| 838,228 A | 12/1906 | Williams |
| 1,105,216 A | 7/1914 | Smith |
| 1,269,815 A | 6/1918 | Hough |
| 2,643,898 A | 6/1953 | Everest et al. |
| 3,429,584 A * | 2/1969 | Hendricks .................... 280/261 |
| 3,823,959 A * | 7/1974 | Winters ........................ 280/234 |
| 3,958,814 A | 5/1976 | Smith |
| 3,960,392 A * | 6/1976 | Read ............................ 280/282 |
| 4,066,273 A | 1/1978 | Lohr |
| 4,109,927 A | 8/1978 | Harper |
| 4,132,435 A | 1/1979 | Wilson |
| 4,186,935 A * | 2/1980 | Rudwick ...................... 280/269 |
| 4,274,651 A | 6/1981 | Dumont |
| 4,279,429 A | 7/1981 | Hopkins et al. |
| 4,432,561 A | 2/1984 | Feikema et al. |
| 4,460,190 A | 7/1984 | Spiess |
| 4,469,344 A | 9/1984 | Coil |
| 4,526,392 A | 7/1985 | Berkstresser |
| 4,572,535 A | 2/1986 | Stewart et al. |
| 4,632,414 A | 12/1986 | Ellefson |
| 4,705,284 A | 11/1987 | Stout |
| 4,789,173 A | 12/1988 | Lofgren et al. |
| 4,826,190 A * | 5/1989 | Hartmann .................... 280/236 |
| 4,903,857 A | 2/1990 | Klopfenstein |
| 4,921,263 A * | 5/1990 | Patin ............................. 280/62 |
| 4,925,200 A | 5/1990 | Jones |
| 4,944,360 A | 7/1990 | Sturges |
| 5,028,064 A * | 7/1991 | Johnson ..................... 280/250.1 |
| 5,082,302 A | 1/1992 | Nacar |
| 5,209,506 A | 5/1993 | Klopfenstein |
| 5,263,732 A | 11/1993 | Harmeyer |
| 5,297,810 A | 3/1994 | Lukyanov |
| 5,322,312 A | 6/1994 | Cammack |
| 5,354,084 A | 10/1994 | Lofgren et al. |
| 5,380,025 A | 1/1995 | Thorpe |

(Continued)

FOREIGN PATENT DOCUMENTS

| DE | 48353 | 8/1889 |
| DE | 87 11 302.3 | 5/1988 |
| FR | 2 657 318 | 7/1991 |
| GB | 110639 | 11/1917 |
| WO | WO 98/21081 | 5/1998 |

*Primary Examiner*—Lesley D. Morris
*Assistant Examiner*—Paul Royal, Jr.
(74) *Attorney, Agent, or Firm*—Fish & Richardson P.C.

(57) ABSTRACT

A human-powered vehicle comprising a structural frame, two front wheels mounted to a forward portion of the frame for rotation, a seat secured to the frame, the seat positioned between the front wheels and adapted to pivot about a seat pivot axis, and a steerable rear wheel mounted to the frame behind the seat and defining a rear wheel kingpin axis, the rear wheel operably linked to the seat such that pivoting of the seat about the seat pivot axis causes pivoting of the rear wheel about the kingpin axis to steer the vehicle.

34 Claims, 12 Drawing Sheets

U.S. PATENT DOCUMENTS

| | | | |
|---|---|---|---|
| 5,383,676 A | | 1/1995 | Valentino |
| 5,536,029 A | | 7/1996 | Gramckow |
| 5,676,388 A | * 10/1997 | Bertani | 280/87.041 |
| 5,803,774 A | | 9/1998 | White |
| 5,833,036 A | * 11/1998 | Gillespie | 188/285 |
| 6,036,210 A | | 3/2000 | Lee |
| 6,062,581 A | * 5/2000 | Stites | 280/263 |
| 6,276,703 B1 | | 8/2001 | Caldwell |
| 6,352,274 B1 | * 3/2002 | Redman | 280/248 |
| 6,572,130 B2 | * 6/2003 | Greene et al. | 280/266 |
| 6,581,947 B2 | * 6/2003 | Andrews et al. | 280/266 |
| 6,659,488 B1 | * 12/2003 | Beresnitzky et al. | 280/282 |
| 2001/0042968 A1 | | 11/2001 | Andrews et al. |

* cited by examiner

MOBILITY ASSISTANCE VEHICLE

TECHNICAL FIELD

This invention relates to mobility assistance devices, and more particularly to a wheeled vehicle for handicapped or rehabilitating users, as well as able-bodied individuals.

BACKGROUND

Wheelchair designs provide very limited mobility when one considers the types of terrain and the varied environments which they are incapable of navigating with any sense of ease.

There are many variations and adaptations derived from the conventional design, including both three-wheeled and four-wheeled assisted mobility devices. Unfortunately, many of these designs also have significant limitations when applied to a wide range of environments and varied terrain and are limited by a combination of one or more of the following: a high risk of tipping over on uneven ground; difficulty in riding over small or moderately-sized obstacles such as ruts, stones or missing pieces of pavement; a high incidence of fatigue or strain involving the hand and wrist; an inability to be operated by a rider having limited use of one hand or arm; difficulty in mounting and dismounting the vehicle due to inherent design constrictions; awkward or inefficient steering and propulsion functions. A vehicle is desired which satisfies a number of these functional limitations.

SUMMARY

According to one aspect, the invention features a human-powered vehicle having a structural frame, two front wheels mounted to fixed axles at a forward portion of the frame for rotation, a seat secured to the frame, the seat positioned between the front wheels and adapted to pivot about a seat pivot axis, and a steerable rear wheel mounted to the frame behind the seat and defining a rear wheel kingpin axis, the rear wheel operably linked to the seat such that pivoting of the seat about the seat pivot axis causes pivoting the rear wheel about the kingpin axis to steer the vehicle.

According to another aspect, the invention features a human-powered vehicle having a structural frame, two front wheels mounted to a forward portion of the frame for rotation, a seat secured to the frame, the seat positioned between the front wheels and adapted to pivot about a seat pivot axis, a steerable rear wheel mounted to the frame behind the seat and defining a rear wheel kingpin axis, the rear wheel operably linked to the seat by a flexible chain assembly such that pivoting of the seat about the seat pivot axis causes pivoting of the rear wheel about the kingpin axis to steer the vehicle, and an actuator spring connecting the seat and the structural frame and biasing the seat toward a neutral pivot position, wherein the seat pivot axis is declined toward the front wheels to define a declination angle of between about 25 and 75 degrees, wherein at least one of the two front wheels is operably connected to a hand-operable crank for propulsion of the vehicle.

According to another aspect, the invention features a human-powered vehicle having a structural frame, two front wheels mounted to a forward portion of the frame for rotation, a seat secured to the frame, the seat positioned between the front wheels and adapted to pivot about a seat pivot axis, a steerable rear wheel mounted to the frame behind the seat and defining a rear wheel kingpin axis, the rear wheel operably linked to the seat by a flexible chain assembly such that pivoting of the seat about the seat pivot axis causes pivoting of the rear wheel about the kingpin axis to steer the vehicle, and an actuator spring connecting the seat and the structural frame and biasing the seat toward a neutral pivot position, wherein the seat pivot axis is substantially vertical, wherein at least one of the two front wheels is operably connected to a hand-operable crank for propulsion of the vehicle.

In one embodiment, the seat pivot axis is substantially vertical. In another embodiment, the seat pivot axis is declined toward the front wheels to define a declination angle between about 25 and 75 degrees, more preferably between about 35 and 50 degrees and most preferably about 45 degrees. The seat pivots at the declination angle about at least two pivot points.

In another embodiment, at least one of the two front wheels of the vehicle is operably connected to a hand-operable crank for propulsion of the vehicle. The vehicle may include two independent by hand-operable cranks, each crank operably connected to a corresponding one of the front wheels. In another embodiment, the vehicle hand-operable cranks are adapted to be rotatable about substantially horizontal axes disposed above the front wheels. The hand-operable cranks can include crank sprockets and the front wheels include wheel sprockets, the crank sprockets being coupled to the wheel sprockets by means for positive engagement. The wheel sprockets can be coupled to the wheels by freewheel sprockets. In one embodiment, the seat is operably connected to the rear wheel by a flexible chain. The chain may be trained about a drive sprocket secured to the seat and a driven sprocket secured to the wheel, the chain being crossed between the drive and the driven sprockets. The seat is operably linked to the rear wheel to define a steering ratio of between about 3:1 and 6:1, and preferably about 4.5:1.

The vehicle may further include independent hand-operable front and rear brakes. In accordance with further embodiments of the invention, the vehicle includes an actuator connecting the seat and the structural fame and biasing the seat toward a neutral pivot position. In one embodiment, the actuator is an adjustable pressurized cylinder or spring, for example. In another embodiment, the front wheels are each mounted for rotation about a respective axle secured to the frame by a fork spanning the wheel. In one embodiment, to improve stability, the front wheels are slanted toward each other to define a positive camber angle with respect to vertical. According to one embodiment, the seat is positioned such that the rear wheel carries between about 20 and 40 percent of a total combined weight of the operator and the vehicle in a static condition. In one embodiment, the front drive wheels are cambered to enhance overall stability of the vehicle.

In accordance with one embodiment, the vehicle includes a steering assembly alignment device located beneath the seat, which includes a shaft collar affixed to the steering drive sprocket. The shaft collar is mounted upon the vertical seat post shaft, and held in position by one or more setscrews. Loosening the setscrews located within the shaft collar allows the drive sprocket to be adjusted relative to the seat post shaft, thereby adjusting alignment of the seat position relative to the position of the rear wheel.

In accordance with further embodiments of the invention, the vehicle may include a damper connecting the rear wheel fork and the structural frame, allowing for improved steering and handling by preventing excessive rotational motion of the rear wheel fork assembly. In another embodiment, the damper is a bi-directional torsion spring which is fitted to the vertical steering tube and provides a dampening effect to any rotational forces.

The mobility assistance devices described herein can provide a safe, efficient and improved approach to enhanced mobility under a wide range of settings and conditions. In addition, they can enable a number of rehabilitative functions, as well as providing recreational cross-training opportunities for able-bodied individuals. They are particularly useful in enhancing the mobility of users with a lower extremity disability and a moderate level of upper body strength. The modes of steering and propulsion of the vehicles can be adapted and configured to complement the unique physical capabilities of such users. In addition to enhancing the mobility of the user, the vehicles can provide therapeutic and rehabilitative benefits.

The details of one or more embodiments of the invention are set forth in the accompanying drawings and the description below. Other features, objects, and advantages of the invention will be apparent from the description and drawings, and from the claims.

DETAILED DESCRIPTION

Throughout the discussion of the illustrative embodiments, it is to be understood that in the figures, like reference generally refer to like elements throughout the different views.

Figure 1:
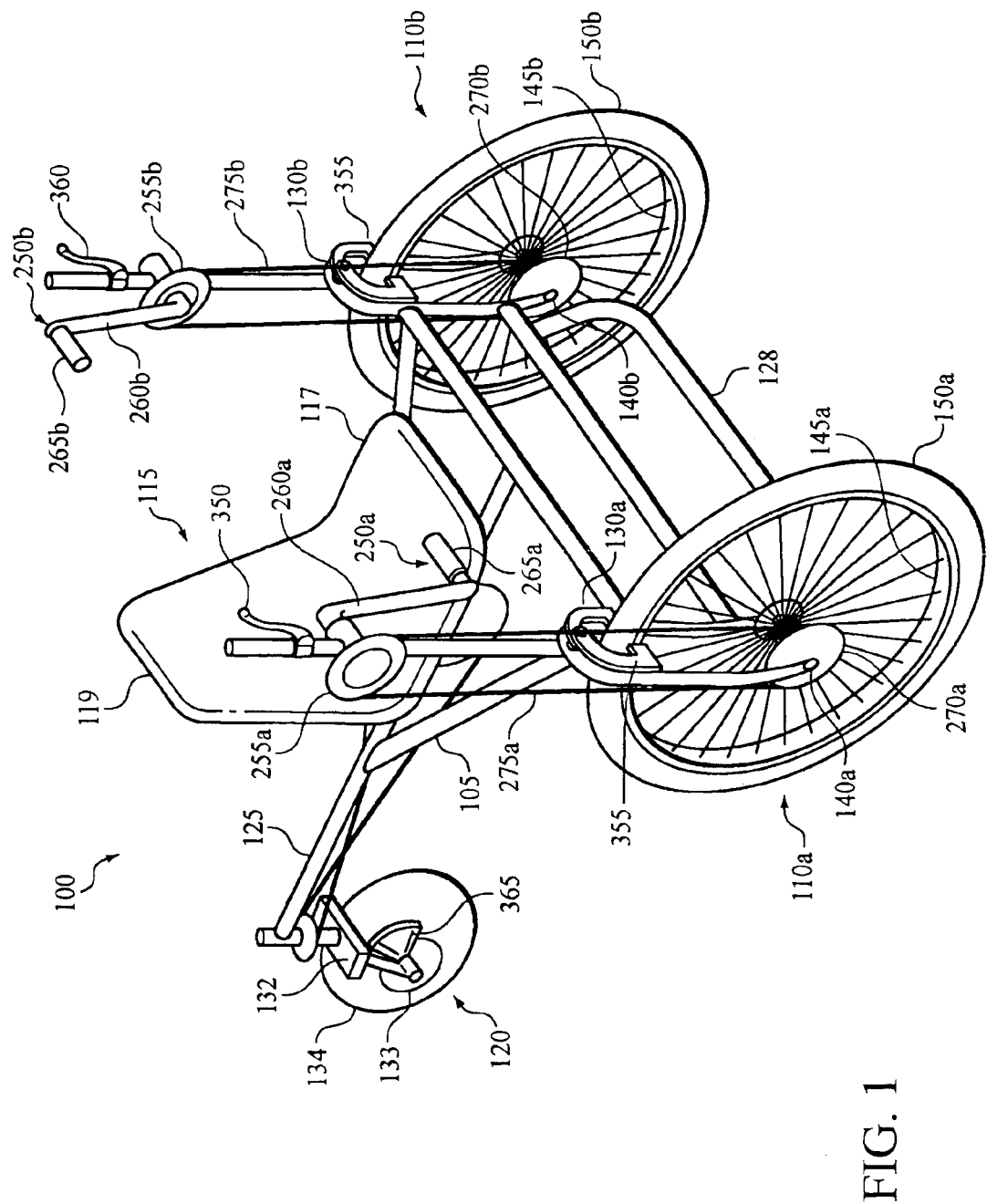
FIG. 1 is a perspective view of the vehicle according to one embodiment of the invention.

Referring to FIGS. 1 and 2, a vehicle 100 has a structural frame 105, two front drive wheel assemblies 110a, 110b (hereafter collectively referred to as 110), a seat 115, and a steerable rear wheel assembly 120. In one embodiment, frame 105 is of tubular construction and consists of a horizontal equilateral triangle with an extension 125 to support the rear wheel assembly 120. The two front drive wheels assemblies 110 may include front forks 130, 130b which are affixed to a forward portion of the frame 105 in front of the seat 115.

The seat 115 is rotatably mounted to the frame 105 between and aft of the two front drive wheels assemblies 110. The seat 115 is operably connected to the rear wheel assembly 120 such that rotation of the seat 115 causes rotation of the rear wheel assembly to effect steering of the vehicle 100. Advantageously, the seat 115 includes a seat base 117 and a seat back 119, the seat base declined rearward to keep the rider well positioned in the seat 115. In some embodiments, the vertical height of the seat base 117 is adjustable and the angle of inclination of the seat back 119 is adjustable. The seat may be constructed from fiberglass, metal or other substantially rigid material. Alternatively, the seat 115 is a simple platform with aluminum rails (not shown) having fabric mesh laced thereon for improved comfort on either the seat base 117 or the seat back 119. The seat 115 may include layers of foam or other resilient materials to increase rider comfort and reduce fatigue. In some embodiments, the vehicle includes a footrest 128. The footrest 128 is attached to a forward lower portion of the frame 105 between the front drive wheel assemblies 110. Appropriate configured rests (not shown) may be included along the footrest 128 for receiving and retaining the feet of the rider.

The rear wheel assembly 120 may include a rear fork 132, a rear hub and rim combination 133 for supporting a rear tire 134. In one embodiment, the rear tire has a high profile for improved rider comfort and stability of the vehicle 100. The front drive wheels assemblies 110 include front drive hubs 140a, 140b (collectively 140), rims 145a, 145b for supporting front tires 150a, 150b. In one embodiment, the front drive hubs 140 are conventional bicycle-style hubs as shown in FIG. 1. In another embodiment, the front drive hubs 140 are a cantilever-style axle and hub combination supported by a single wheelchair-style mount (not shown). In one embodiment, the front forks 130 are 24-inch bicycle forks and may include gussets (not shown) to add additional strength.

Figure 9:
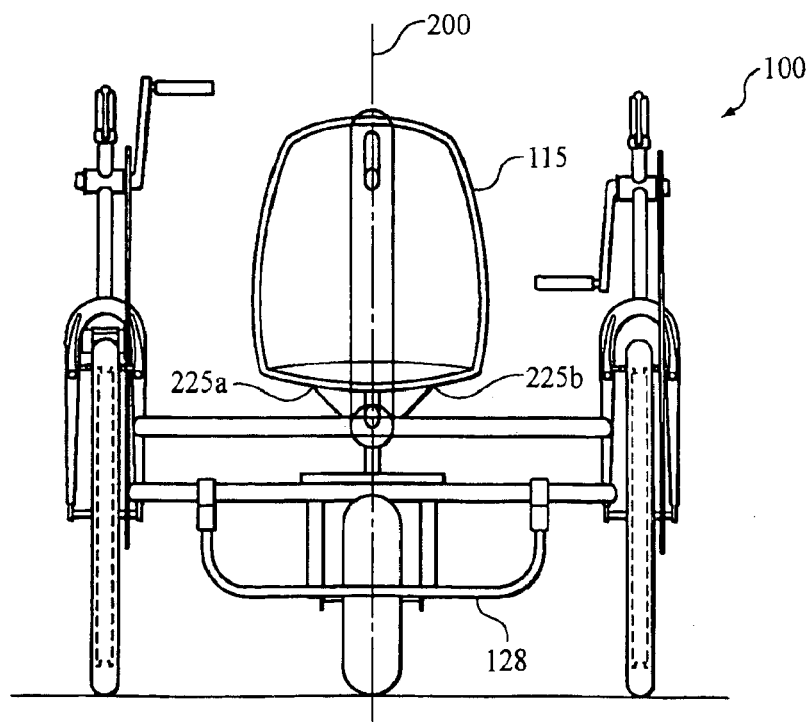
FIG. 9 is a front view of the vehicle of FIG. 6.

Advantageously, the vehicle 100 is configured to enable a user to mount and dismount the seat 115 independently or with minimal assistance. In one embodiment, the user mounts and dismounts the seat 115 from the front of the vehicle 100 between the front drive wheel assemblies 110 utilizing the foot rest 128. Mounting and dismounting the vehicle can vary according to the combined abilities and disabilities of the particular user. The overall size and configuration of the vehicle 100 may be modified to accommodate the size of the user and the intended application for the mobility device (e.g., indoor or outdoor use). In one embodiment, the seat 115 is located on the frame 105 aft of the front drive wheel assemblies 110 such that the rear tire 134 carries between about 20 and 40 percent of a total combined weight of the operator and the vehicle 100 in a static condition. The configuration of the frame 105 and the diameter of the rear wheel 120 ensures a relatively low center of gravity for enhanced stability of the vehicle 100, particularly over uneven terrain. In some embodiments the front drive wheel assemblies 110 are slanted toward each other above the frame 105 to define a positive camber angle with respect to vertical (see FIG. 9) to improved overall vehicles stability.

Figure 4:
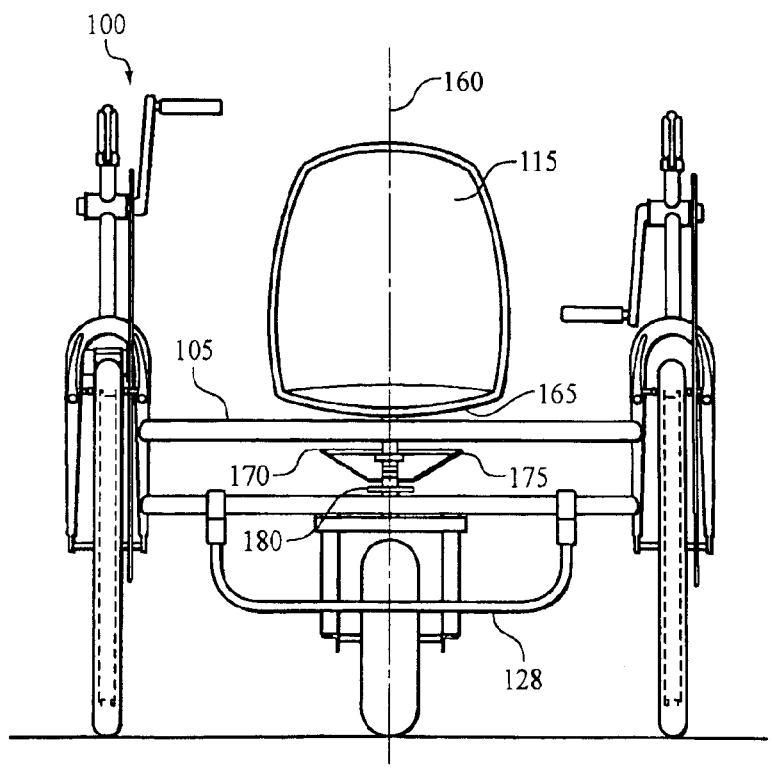
FIG. 4 is a front view of the vehicle of FIG. 1.

The frame 105 may be constructed from a range of materials including for example, aluminum, steel, or steel alloy, depending on the intended application of the vehicle 100. In one embodiment, the frame 105 is constructed of primarily 1¼-inch 4130 chrome moly tubing, which has been gas metal arc welded (MIG welded). The 4130 chrome moly tubing provides a high strength-to-weight ratio. Referring now collectively to FIGS. 2A, 2B, 3 and 4, and in one embodiment, steering of the vehicle is accomplished by rotation of the seat 115 about a substantially vertical axis 160 (FIG. 4). The seat 115 is mounted to a platform 165 that is affixed to the top end of a steering support shaft 170. The seat steering support shaft 170 is rotatably affixed to the frame with a bearing assembly, such as a bicycle headset, to permit free rotation of the seat 115. A drive sprocket or chain ring 175 is affixed to the lower end of the seat support shaft 170. The rear fork 132 includes a driven rear sprocket (or pulley) 180 attached to the fork steerer tube 198 and rotatably affixed to the frame 105, with a headset or other bearing assembly. The driven rear sprocket or pulley 180 is attached to the fork steerer tube 198 below the bearing surface on the frame 105.

Figure 2A:
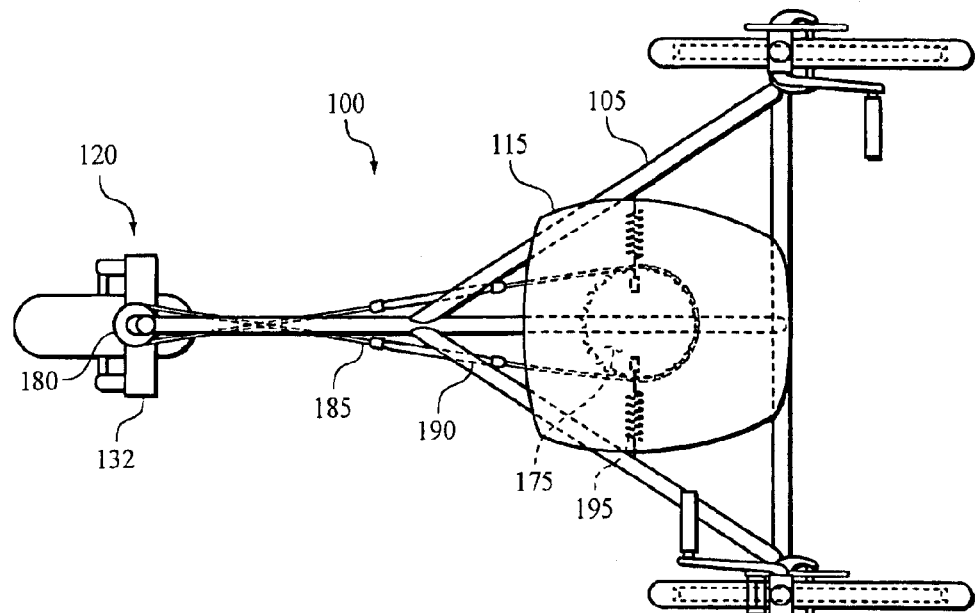
FIGS. 2A and 2B depict top views of the vehicle of FIG. 1 in neutral and turned positions, respectively.
Figure 2B:
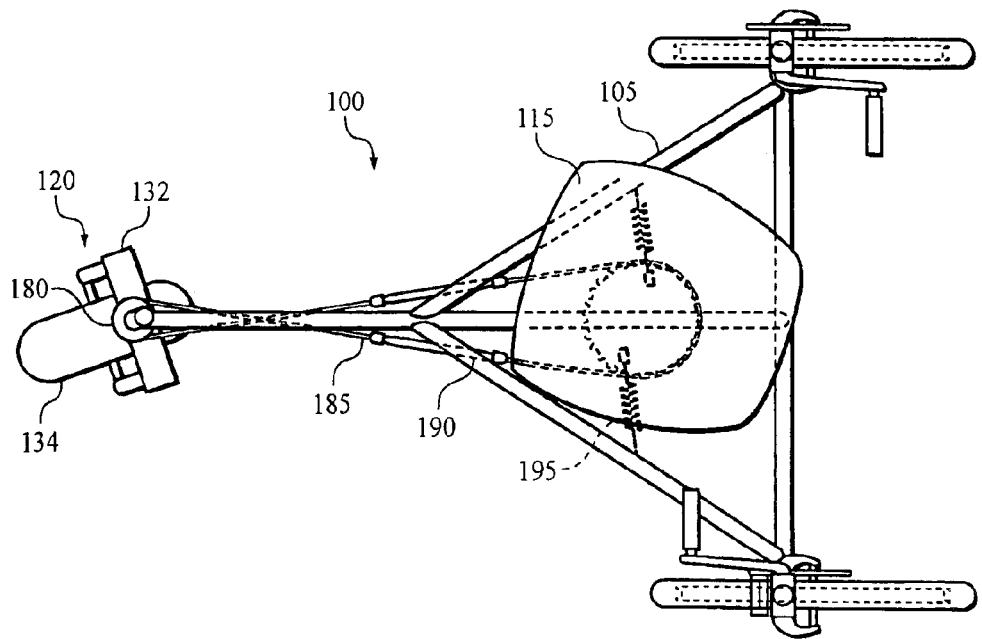

In one embodiment, a chain 185 is trained around the steering drive sprocket 175 and the rear driven sprocket 180 to operably connect the seat 115 and the rear wheel assembly 120. The chain 185 may be, for example, a flexible chain, roller chain or nylon belt. Advantageously, the chain 185 is disposed about the drive sprocket 175 and the rear driven sprocket 180, crossed in a "figure-8" configuration as shown in FIGS. 1, 2A and 2B. The chain 185 can include turnbuckles 190a, 190b to enable the adjustment of the tension of the chain 185 and prevent the chain 185 from derailing from the drive sprocket 175 and rear driven sprocket 180. In some embodiments, the relative position of the drive sprocket 175 can be adjusted to properly establish the chain line between the drive sprocket 175 and the rear driven sprocket 180.

Figure 2C:
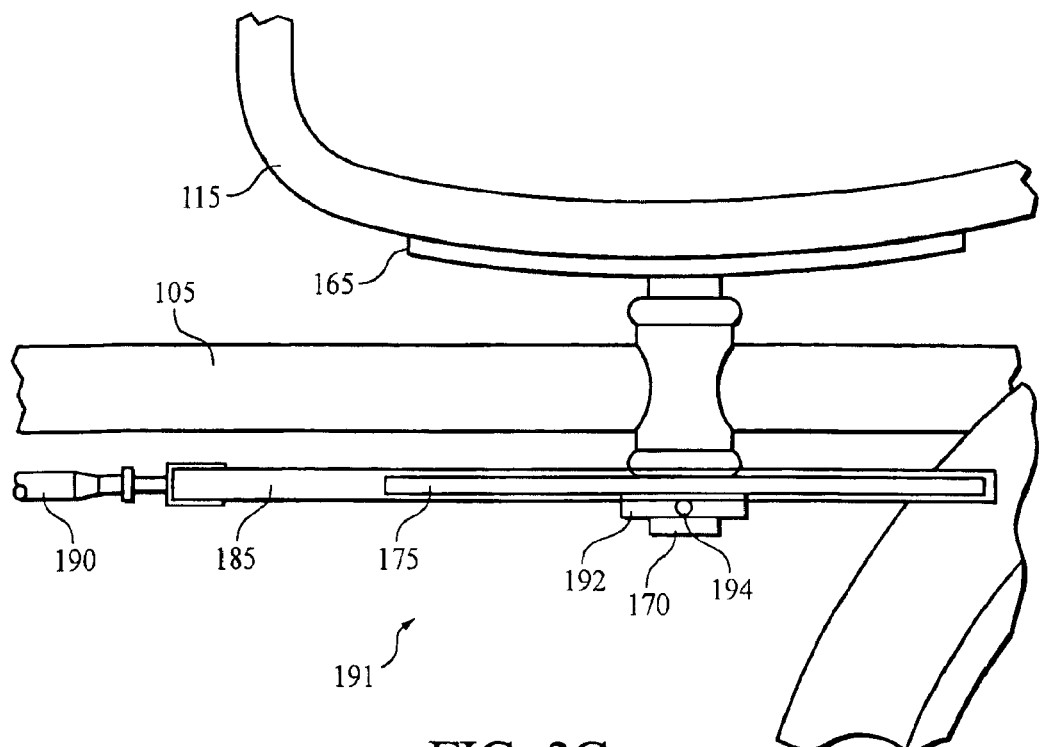
FIG. 2C is a detailed side view of the vehicle of FIG. 1, depicting the steering assembly alignment device.

Referring to FIG. 2C, one embodiment of the vehicle 100 includes a steering assembly alignment device 191 located beneath the seat 115, which includes a shaft collar 192 affixed to the steering drive sprocket 175. The shaft collar 192 is disposed upon the seat steering support shaft 170 and held in position by set screws 194.

Loosening the set screws 194 located within the shaft collar 192 allows the drive sprocket 175 to be adjusted relative to the seat steering post shaft 170, thereby adjusting alignment of the seat position relative to the position of the rear wheel assembly 120.

Figure 2D:
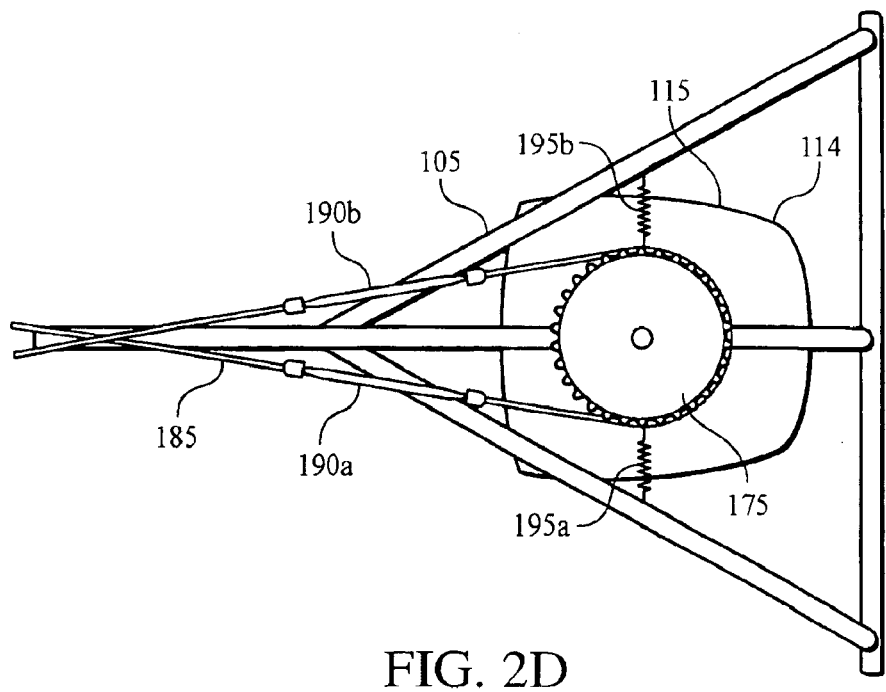
FIG. 2D is a detailed bottom view of the vehicle of FIG. 1.
Figure 3:
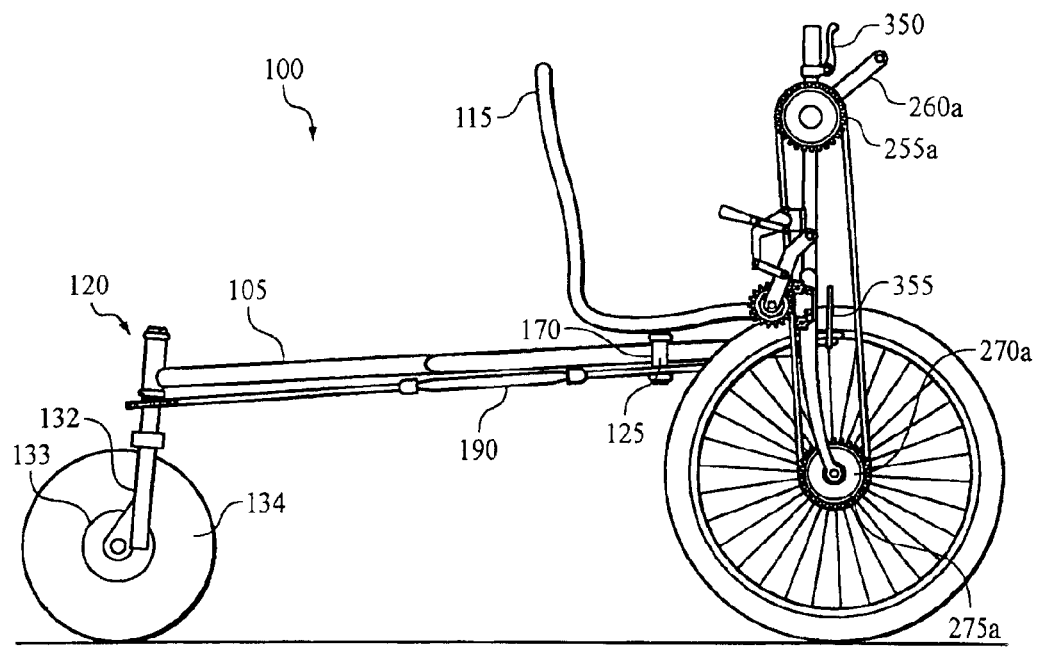
FIG. 3 is a side view of the vehicle of FIG. 1.

Referring to FIG. 2D, and in one embodiment, the seat steering assembly 114, comprised of the seat 115, seat plate 165, seat steering support shaft 170, actuator 195, drive sprocket 175, steering shaft collar 192 and steering shaft collar set screw 194, includes at least one actuator 195 disposed between the platform 165 at a first end and the frame 105 at a second end. When the seat 115 is rotated for turning the vehicle 100, the actuator 195 is biased toward returning the seat 115 and consequently the rear wheel assembly 120 toward a centered, straight-ahead position. The actuator 195 may be a pre-tensioned adjustable spring, an adjustable pressurized cylinder, or a similar biasing device. In one embodiment, the actuator 195 is adjusted to accommodate, for example, the weight of the rider and the intended use of the vehicle 100.

In operation, when the rider rotates the seat 115 in one direction, the crossed chain 185 rotates the rear wheel assembly 120 in an opposite direction, but the vehicle turns in a direction corresponding to the direction of rotation of the seat 115. As shown in FIG. 2B, rotating the seat 115 toward the right, results in a rotation of the rear wheel assembly 120 toward the left. This results in the vehicle 100 turning to the right, corresponding to the direction of rotation of the seat 115.

Figure 5:
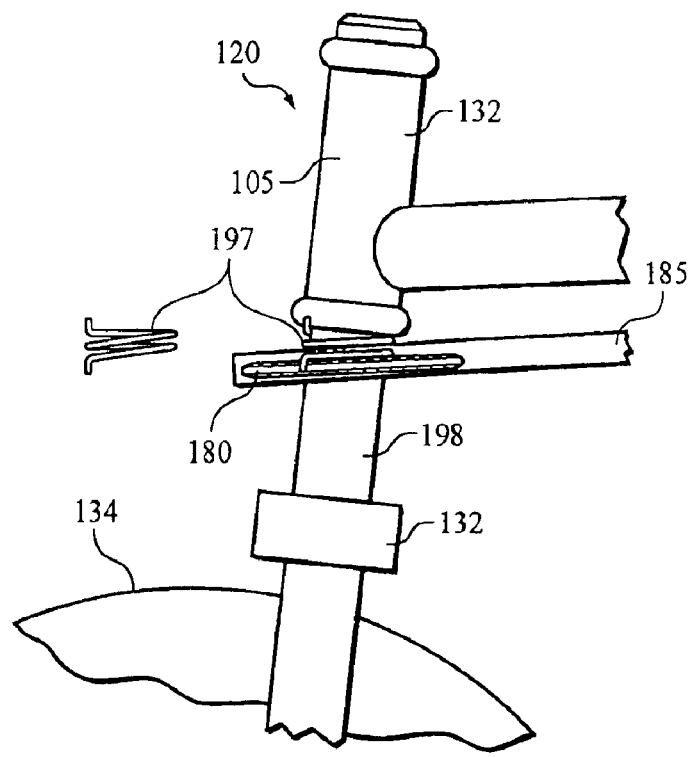
FIG. 5 is a detailed view of the rear wheel steering assembly of the vehicle of FIG. 1.

Referring to FIG. 5, in one embodiment, the vehicle may include a damper 197 connecting the rear wheel fork 132 and the structural frame 105, allowing for improved steering and handling by preventing excessive rotational motion of the rear wheel fork 132 assembly. In one embodiment, the damper 197 is a bi-directional torsion spring which is fitted to the vertical steering tube 198 and provides a dampening effect to any rotational forces.

Figure 6:
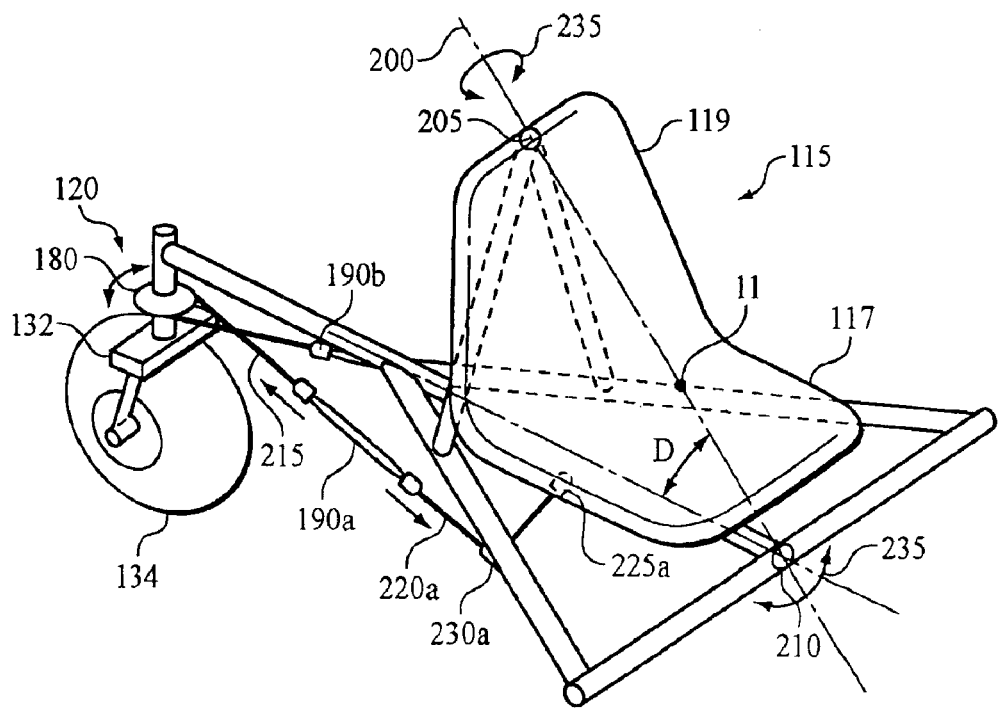
FIG. 6 is a perspective view of the vehicle according to another embodiment of the invention.

Referring now to FIG. 6, in a second embodiment, steering of the vehicle 100 is accomplished by rotation of the seat 115 about a seat pivot axis 200, which is declined toward the front of the vehicle 100 to define a declination angle D. The declination angle D is preferably between about 25 degrees and 75 degrees, more preferably between about 35 degrees and 50 degrees and most preferably about 45 degrees. In one embodiment, the seat 115 is suspended on and rotates about an upper pivot attachment point 205 and a lower pivot attachment point 210 positioned along the seat pivot axis 200.

The upper attachment point 205 is mounted high on the seat back 119 and the lower pivot attachment point is mounted in a frontward portion of the seat base 117. As the angle of rotation of the seat 115 is not substantially parallel to the angle of rotation of the rear wheel assembly 120, as previously described with reference to FIGS. 1 to 2C, a modified steering linkage is utilized. A chain 215 is trained about the rear sprocket 180 of the rear wheel assembly 120. Two steering cables 220a, 220b (collectively 220) attached to each end of the chain 215 at turnbuckles 190a, 190b (collectively 190) operably connect the rear sprocket 180 of the rear wheel assembly 120 to the seat 115 at cable attachment points 225a, 225b (collectively 225). In one embodiment, the steering cables 220 are aircraft cables having swaged ends for attachment to the turnbuckles 190 and the seat 115.

Figure 7A:
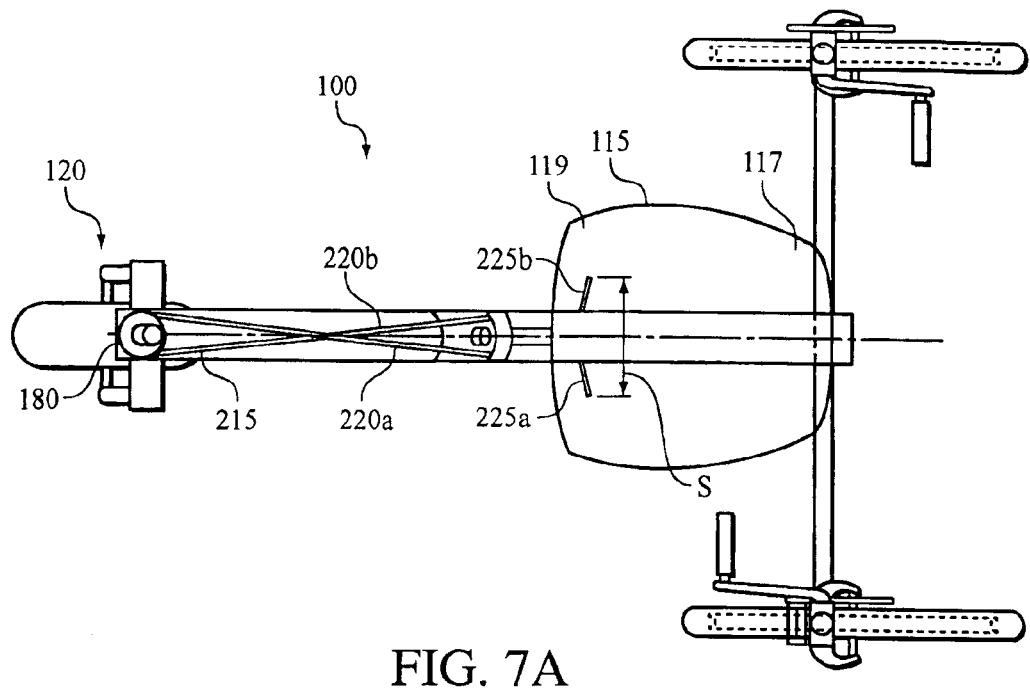
FIGS. 7A and 7B are top views of the vehicle of FIG. 6.
Figure 7B:
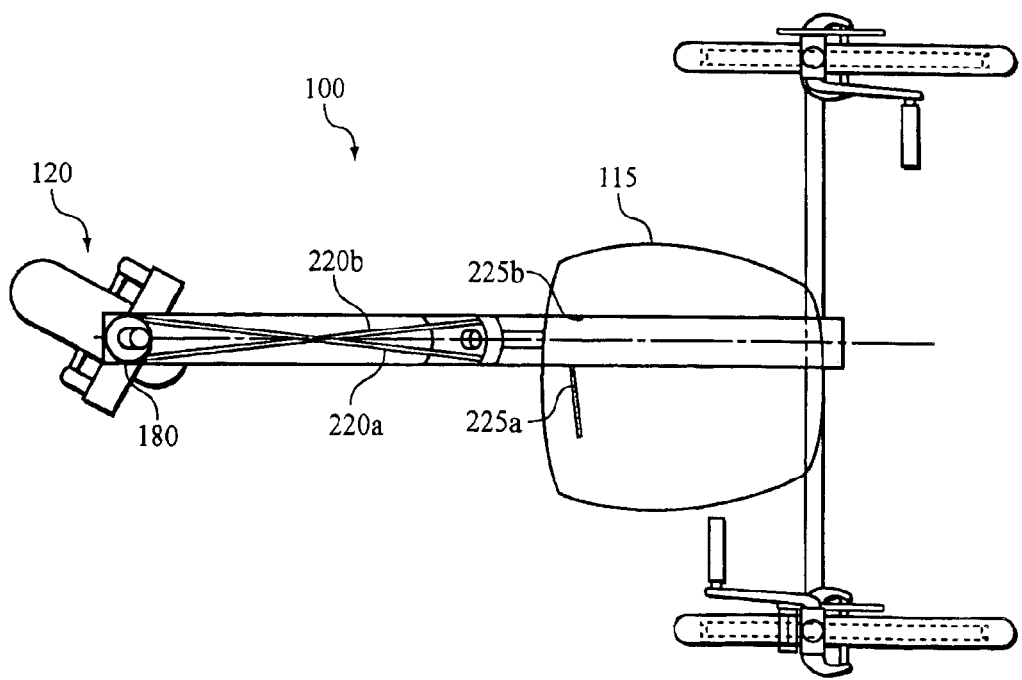
Figure 8:
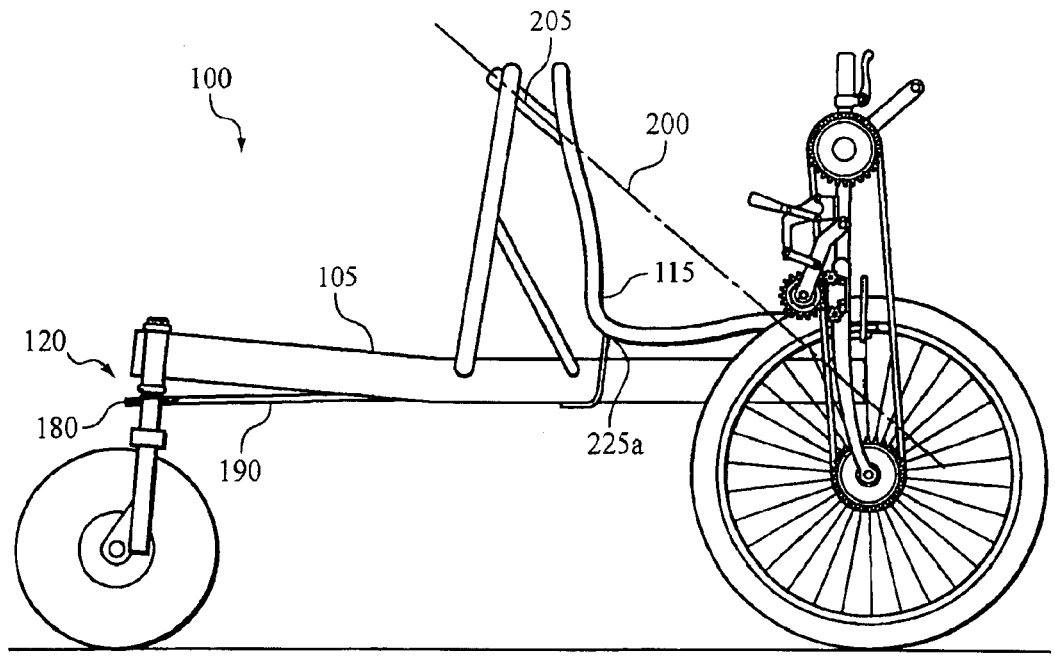
FIG. 8 is a side view of the vehicle of FIG. 6.

Advantageously, the chain 215 is crossed about the rear sprocket 180 in a "figure-8" configuration as shown in FIGS. 6, 7A and 7B. The turnbuckles also provide adjustability of tension of the chain 215 about the rear sprocket 180. With renewed reference to FIG. 6, the steering cables 220 are redirected from a substantially horizontal orientation to a substantially vertical orientation for attachment to the seat 115 at attachment points 225a, 225b through guides 230a, 230b (collectively 230). The guides 230 are affixed to the frame 105.

Referring now collectively to FIGS. 6, 7A–7B, 8 and 9, in operation, when the rider leans to turn the seat 115 in one direction, the chain 215 rotates the rear wheel assembly 120 in an opposite direction, but the vehicle turns in a direction corresponding to a the direction of rotation of the seat 115. As shown in FIG. 7B, rotating the seat back 119 toward the left results in a rotation of the rear wheel assembly 120 toward the right. This results in the vehicle 100 turning to the left, corresponding to the direction of rotation of the seat 115. This steering configuration allows the rider to lean into turns and improves overall maneuverability and stability of the vehicle 100. According to one embodiment, the ratio between the diameter of the rear sprocket 180 and the distance between attachment points S is selected such that, the seat 115 rotates in the direction of arrows 235 about 10 degrees to the left and right to achieve a full range of the vehicle 100.

Figure 10:
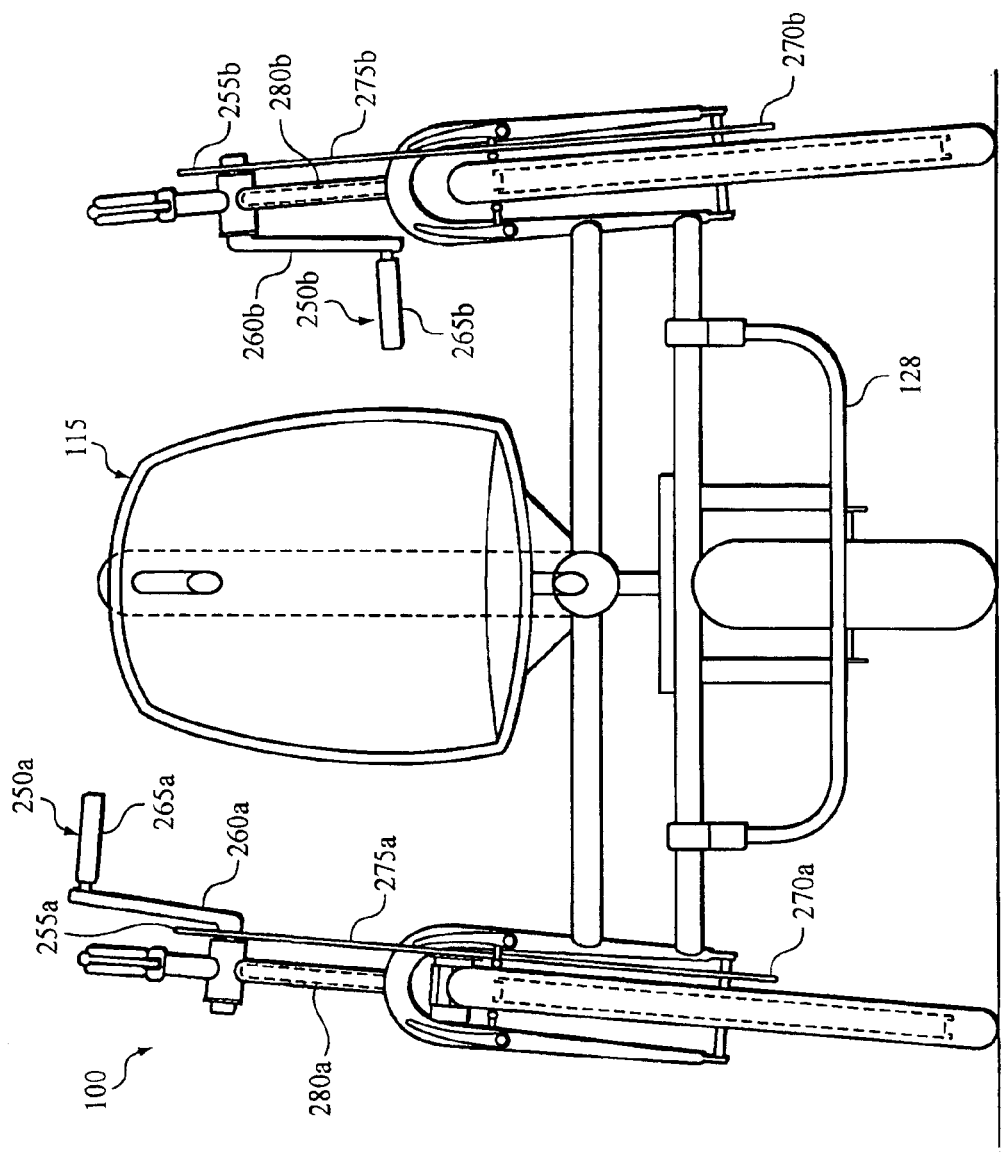
FIG. 10 is a front view of an alternative embodiment of the vehicle of FIG. 6 where the front drive wheels are cambered to enhance stability of the vehicle.
Figure 11A:
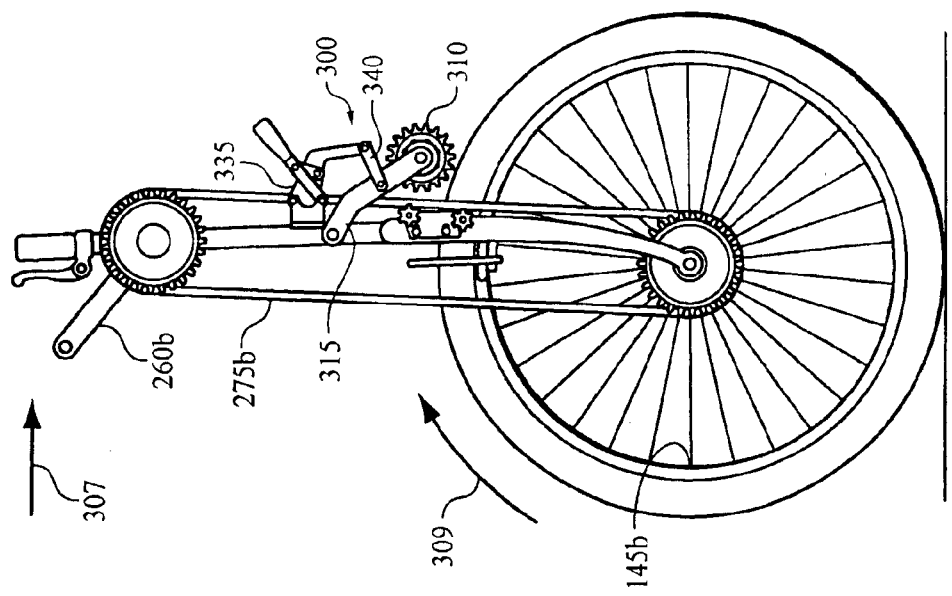
FIGS. 11A and 11B are side views of a reverse gear drive in an engaged and disengaged positions, respectively.
Figure 11B:
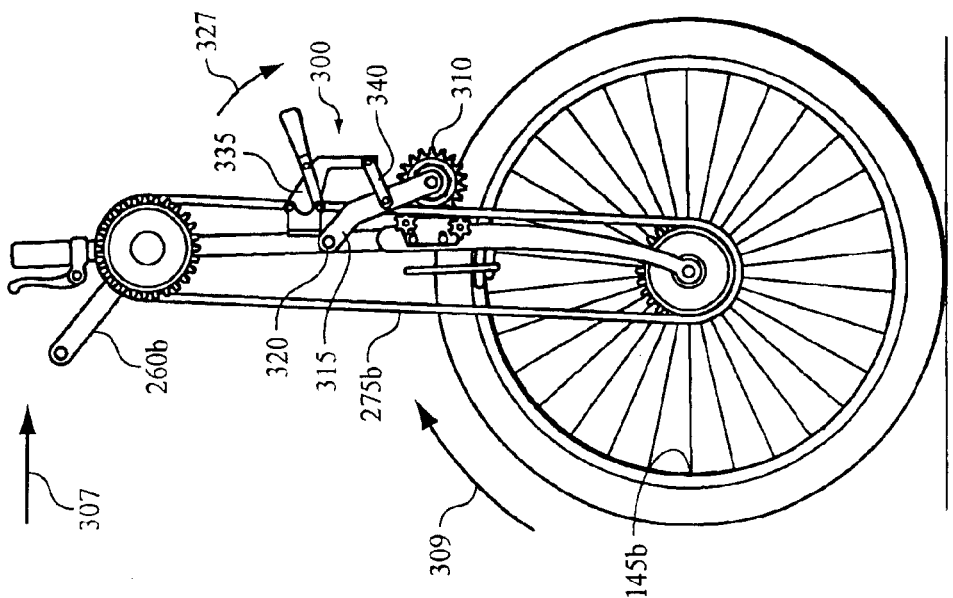
Figure 12A:
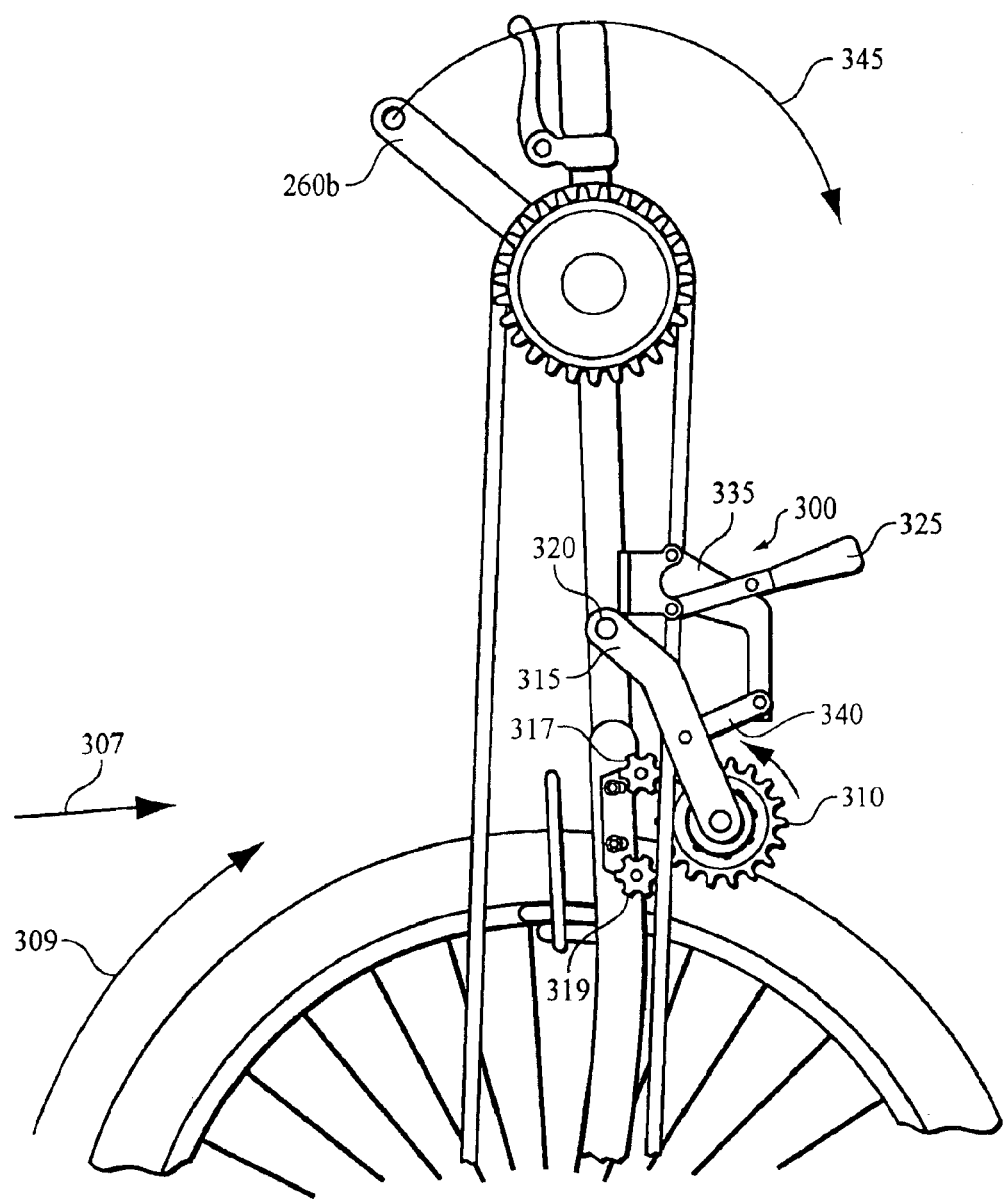
FIGS. 12A and 12B show detailed views of the reverse gear of FIGS. 11A and 11B.
Figure 12B:
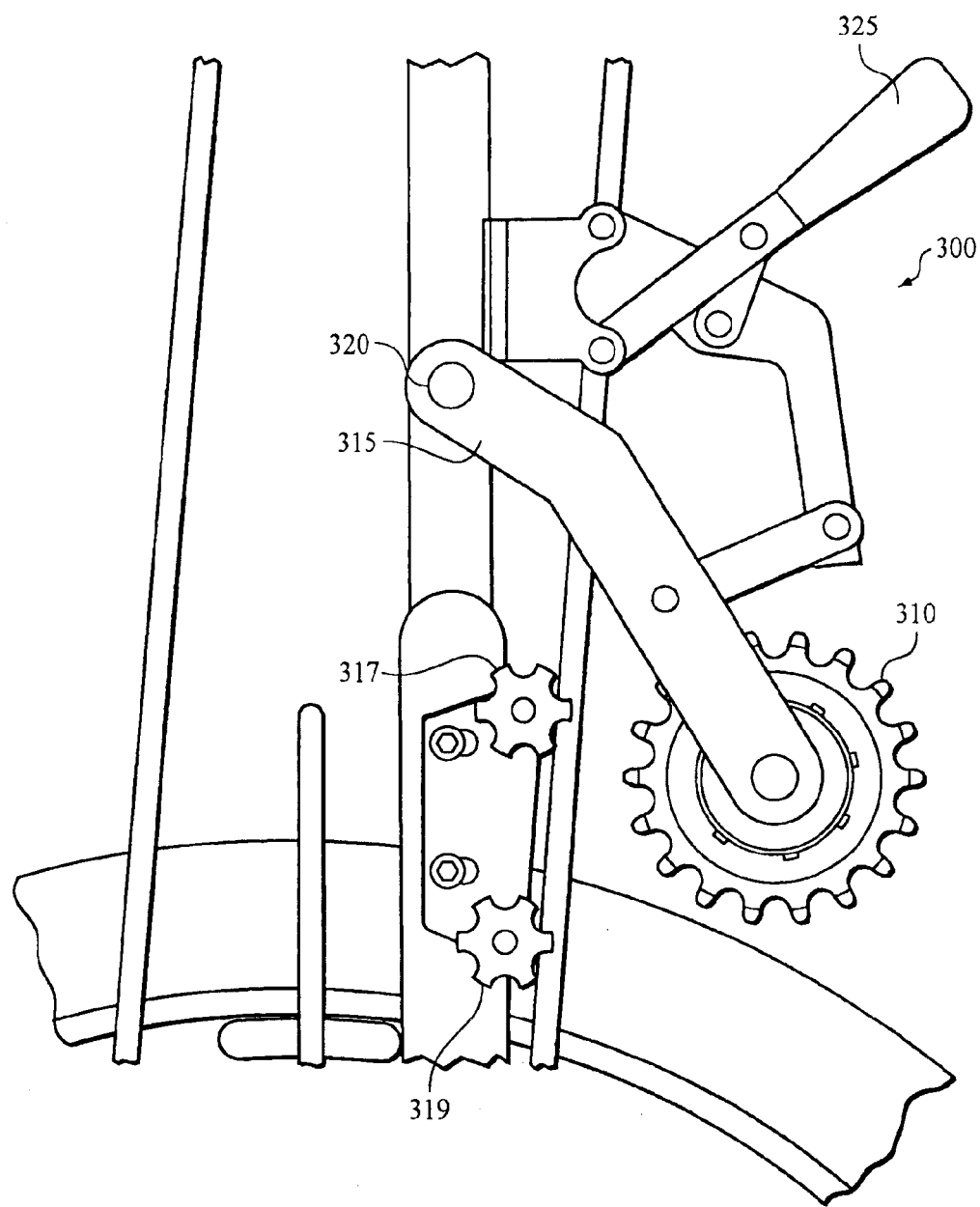
Figure 13:
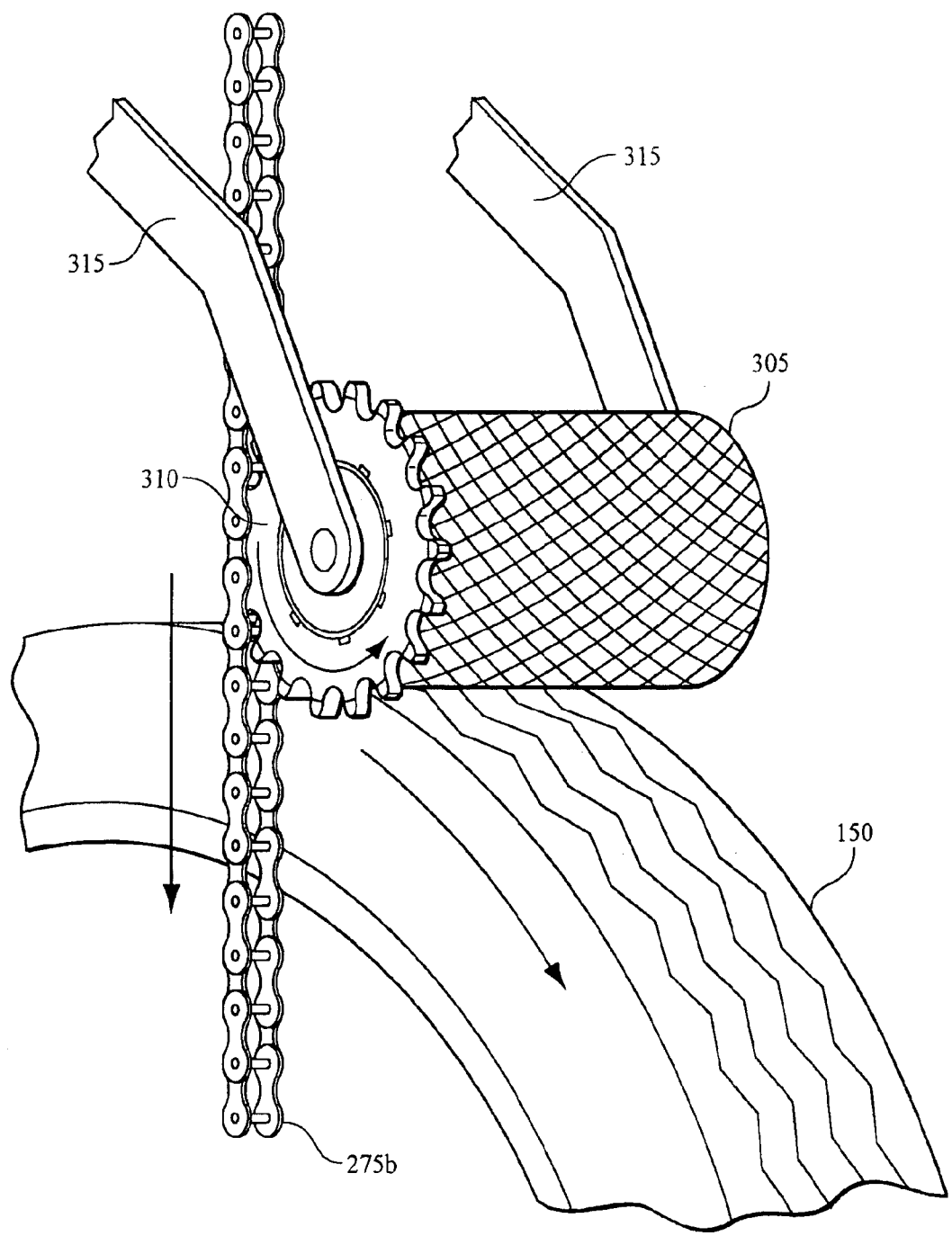
FIG. 13 shows a detailed view of components of the reverse gear drive of FIGS. 11 and 12.

Referring now to FIGS. 1 and 10, in one embodiment, the vehicle 100 includes two independent hand-operable cranks 250a, 250b (collectively 250) operably connected to a corresponding front drive wheel assembly 110 for propulsion of the vehicle 100. The cranks 250 include crank sprocket 255a, 255b (collectively 255), crank arms 260a, 260b (collectively 260) and handle 265a, 265b (collectively 265) rotatably mounted to the crank arms 260. In one embodiment, the crank sprockets 255 are conventional bicycle chain rings, the crank arms 260 are a bicycle pedal crank and the handles 265 are a modified pedal bolt surrounded with a padded sleeve for comfort and grip. The crank sprockets 255 are coupled to front wheel sprockets 270a, 270b (collectively 270) by front drive chains 275a, 275b (collectively 275). The chains 275 are roller chains, toothed nylon belts, or similar flexible connecting means. In one embodiment, the crank sprocket 255 are each a 28-tooth chain ring and the front wheel sprockets 270 are each a 32-tooth chain ring. The front wheel sprockets 270 are coupled to front wheel drive hubs 140.

In operation, rotating the handles 265 in a first direction, rotates the front drive wheel assembly 110 in a forward direction. Advantageously, the front wheel sprockets 270 may be freewheel sprockets, which allow the rider to pedal the vehicle 100 forward and coast if not pedaling. Also, by employing freewheel sprockets, the handles 265 can be rotated in a second direction to position the handles 265 for maximum leverage when, for example, starting the vehicle 100 from a stationary position. Tension in the front drive chains 275 is maintained and adjusted by changing the height of the hand operable crank assemblies 250 disposed over the front fork steerer tubes 280a, 280b (collectively 280). The position of the adjustable crank assembly is held in place over the front fork steering tubes 280 by two pinch bolts, for example (not shown). Different lengths of the crank arms 260, varying configuration of handles 265, and crank sprocket 255 to front wheel sprockets 270 ratios are all contemplated by the invention to suit particular applications.

In one embodiment, the vehicle 100 may include a reverse gear drive 300 as depicted in FIGS. 11A, 11B, 12A, 12B and 13. The drive 300 is attached to one or both adjustable crank assemblies 250 above the front drive wheel assemblies 110. The circumferential surface of a reverse roller 305 is scored or knurled for direct positive engagement with the front tires 150. The reverse direction is denoted arrow 307 and the direction of reverse rotation is denoted by the arrow 309. The reverse cog 310 is positioned for engagement of the chain 275 against upper and lower jockey rollers 317, 319. The reverse drive 300 includes a reverse roller 305 (FIG. 13) joined to a freewheeling reverse 310 which is rotatably attached to the bracket 315. Bracket 315 is attached rotatably to a pivot 320. A clamp handle 325 is rotatably attached to the bracket 315 via a first lever 335 and a second lever 340. In one embodiment, the clamp 325 of the reverse gear drive 300 is a Destaco-type clamp which simultaneously locks the reverse roller 305 into position for engagement with the front tires 150 and the reverse cog 310 into position for engagement with the front drive chain 275 until manually released. Other suitable clamp devices are contemplated.

In operation, movement of the clamp handle 325 in the direction of the arrow 327 (FIG. 11A and 13) displaces the first and second levers 335, 340 thereby rotating bracket 315 about the pivot 320 and engaging the reverse roller 305 with the front tire 150 and engaging the reverse cog 310 with the chain 275b. With the reverse drive 300 engaged, rotation of the crank 260 in the direction of the arrow 345 rotates the reverse cog 310 and the reverse roller 305 for rotation of the front drive wheels 110 in the direction necessary for rearward propulsion of the vehicle 100. The freewheeling reverse cog 310 allows for forward motion of the vehicle 100 while the reverse drive assembly is engaged. Other types of reverse drive mechanisms are contemplated.

With renewed reference to FIG. 1, and in one embodiment, the vehicle 100 includes individual braking controls. A first front brake lever 350 controls one or both of the front brakes 355 attached to the front forks 130 for braking the front drive wheel assemblies 110 and a second brake lever 360 may control either a front brake 355 or a rear brake 365 which is attached to the rear wheel assembly 120. In one embodiment, front brakes 355 are linear side pull or center pull brakes positioned on the forks 130 to come into contact with each front rim 145 when activated by a front brake lever 350, 360. In another embodiment, the front brakes are hub brakes. In one embodiment, the rear brake 365 is a mechanical disc brake mounted to the rear hub of the rear wheel 120. The vehicle 100 includes a parking brake (not shown), which may be a lockable detent pin within a front brake lever 350, 360 for locking one or more wheels. In such embodiments, the parking brake retains the vehicle 100 in a stationary position during transfers, mounting or dismounting.

The activation mechanisms linking the first and second brake levers 350, 360 and the front brakes and rear brakes 355, 365, can include, for example, stainless steel cables with or without a lined housing, hydraulic lines or compressed air. Other braking systems suited to accommodate a rider's abilities and the vehicle application, including the full range of hand-activated braking mechanisms designed for bicycles and motorcycles in various combinations with the activation mechanisms are contemplated.

A number of embodiments have been described. Nevertheless, it will be understood that various modifications may be made without departing from the spirit and scope of the invention. Accordingly, other embodiments are within the scope of the following claims. For example, for rehabilitative applications, the vehicle can include a foot pedal assembly (not shown) configured as in a conventional bicycle foot crank mechanism to which the rider's feet can be positioned. In one embodiment, at least one of the hand crank sprockets 255 and the foot pedal assembly are operably connected by a direct drive arrangement. In this configuration, the drive chain 275 attached to the crank sprockets 255 provides propulsion of the vehicle 100 and simultaneously rotates the foot pedals, allowing improved circulation to and neuro-stimulation of the lower limbs.

The foregoing embodiments are therefore to be considered in all respects illustrative rather than limiting of the invention described herein. The scope of the invention is thus indicated by the appended claims rather than by the foregoing description, and all changes which come within the meaning and range of equivalency of the claims are therefore intended to be embraced herein.

What is claimed is:

1. A human-powered vehicle comprising:
   a structural frame;
   two front wheels mounted to fixed axles at a forward portion of the frame for rotation;
   a seat secured to the frame, the seat positioned between the front wheels and adapted to pivot about a seat pivot axis;
   a steerable rear wheel mounted to the frame behind the seat and defining a rear wheel kingpin axis, the rear wheel operably linked to the seat such that pivoting of the seat about the seat pivot axis causes pivoting the rear wheel about the kingpin axis to steer the vehicle; and at least one hand-operable crank disposed above the front wheels and operably connected thereto for propulsion of the vehicle.

2. The vehicle of claim 1 further comprising two independent hand-operable cranks, each crank operably connected to a corresponding front wheel.

3. The vehicle of claim 2 further comprising at least one reverse drive for rearward propulsion of the vehicle.

4. The vehicle of claim 3 wherein the hand-operable cranks are adapted to be rotatable about substantially horizontal axes disposed above the front wheels.

5. The vehicle of claim 4 wherein the hand-operable cranks comprise crank sprockets and the front wheels include wheel sprockets, the crank sprockets being coupled to the wheel sprockets by means for positive engagement.

6. The vehicle of claim 1 wherein the seat is operably connected to the rear wheel by a linkage comprising a flexible chain, roller chain or nylon belt.

7. The vehicle of claim 6 wherein the linkage is trained about a drive sprocket secured to the seat and a driven sprocket secured to the rear wheel steering assembly, the lankage being crossed between the drive and the driven sprockets.

8. The vehicle of claim 7 wherein the drive sprocket is disposed on a seat support shaft allowing alignment of the rear wheel relative to the seat position.

9. The vehicle of claim 1 further comprising an actuator connecting the seat and the structural frame and biasing the seat toward a neutral pivot position.

10. The vehicle of claim 9 wherein the bias of the actuator is adjustable by the user.

11. The vehicle of claim 10 wherein the actuator comprises a pressurized cylinder.

12. The vehicle of claim 10 wherein the actuator comprises a spring.

13. The vehicle of claim 1 wherein the hand-operable crank comprises:
a crank sprocket;
a crank arm; and
a crank handle rotatably mounted to the crank arm.

14. The vehicle of claim 13 wherein the crank sprocket is configured to rotate three-hundred and sixty degrees.

15. The vehicle of claim 1 wherein a steering damper is connected to the rear wheel steering assembly and the structural frame.

16. The vehicle of claim 1 further comprising independent and hand-operable front and rear brakes.

17. The vehicle of claim 1 wherein the structural frame further comprises an adjustable footrest positioned between the front wheels.

18. The vehicle of claim 1 wherein the front wheels are each mounted for rotation about a respective axle secured to the frame by a fork spanning the wheel.

19. The vehicle of claim 1 wherein the front wheels are each mounted for rotation about a cantilevered axle secured to the frame.

20. The vehicle of claim 1 wherein the front wheels are slanted toward each other to define a positive camber angle with respect to vertical.

21. The vehicle of claim 1 wherein the camber angle is between about 1 and 10 degrees.

22. The vehicle of claim 1 wherein the seat is positioned such that the rear wheel carries between about 20 and 40 percent of a total combined weight of the operator and the vehicle when in a static condition.

23. A human-powered vehicle comprising:
a structural frame;
two front wheels mounted to fixed axles at a forward portion of the frame for rotation;
a seat secured to the frame, the seat positioned between the front wheels and adapted to pivot about a seat pivot axis; and
a steerable rear wheel mounted to the frame behind the seat and defining a rear wheel kingpin axis, the rear wheel operably linked to the seat such that pivoting of the seat about the seat pivot axis causes pivoting the rear wheel about the kingpin axis to steer the vehicle;
wherein the seat pivot axis is substantially vertical.

24. A human-powered vehicle comprising:
a structural frame;
two front wheels mounted to fixed axles at a forward portion of the frame for rotation;
a seat secured to the frame, the seat positioned between the front wheels and adapted to pivot about a seat pivot axis; and
a steerable rear wheel mounted to the frame behind the seat and defining a rear wheel kingpin axis, the rear wheel operably linked to the seat such that pivoting of the seat about the seat pivot axis causes pivoting the rear wheel about the kingpin axis to steer the vehicle;
wherein the seat pivot axis is declined toward the front wheels to define a declination angle.

25. The vehicle of claim 24 wherein the declination angle is between about 25 and 75 degrees.

26. The vehicle of claim 24 wherein the declination angle is about 45 degrees.

27. The vehicle of claim 24 wherein the seat has an upper seating surface, the pivot axis intersecting the upper seating surface.

28. A human-powered vehicle comprising:
a structural frame;
two front wheels mounted to fixed axles at a forward portion of the frame for rotation;
a seat secured to the frame, the seat positioned between the front wheels and adapted to pivot about a seat pivot axis, the seat pivot axis being declined toward the front wheels to define a declination angle; and
a steerable rear wheel mounted to the frame behind the seat and defining a rear wheel kingpin axis, the rear wheel operably linked to the seat such that pivoting of the seat about the seat pivot axis causes pivoting the rear wheel about the kingpin axis to steer the vehicle;
wherein a chain is trained around a driven sprocket secured to the rear wheel steering assembly, the chain attached directly to first and second portions of the seat by first and second cables, the chain being crossed between the driven sprocket and the first and second portions of the seat.

29. The vehicle of claim 28 wherein the chain is adjustably attached to at least one of the first and second cables.

30. The vehicle of claim 28 further comprising first and second guides to redirect the cables from a substantially horizontal orientation to a substantially vertical orientation.

31. A human-powered vehicle comprising:
a structural frame;
two front wheels mounted to a forward portion of the frame for rotation;
a seat secured to the frame, the seat positioned between the front wheels and adapted to pivot about a seat pivot axis;
a steerable rear wheel mounted to the frame behind the seat and defining a rear wheel kingpin axis, the rear wheel operably linked to the seat by a flexible chain assembly such that pivoting of the seat about the seat pivot axis causes pivoting of the rear wheel about the kingpin axis to steer the vehicle; and an actuator spring connecting the seat and the structural frame and biasing the seat toward a neutral pivot position;

wherein the seat pivot axis is declined toward the rear wheel to define a declination angle of between about 25 and 75 degrees;

wherein at least one of the two front wheels is operably connected to a hand-operable crank disposed above the front wheels for propulsion of the vehicle.

32. A human-powered vehicle comprising:

a structural frame;

two front wheels mounted to a forward portion of the frame for rotation;

a seat secured to the frame, the seat positioned between the front wheels and adapted to pivot about a seat pivot axis;

a steerable rear wheel mounted to the frame behind the seat and defining a rear wheel kingpin axis, the rear wheel operably linked to the seat by a flexible chain assembly such that pivoting of the seat about the seat pivot axis causes pivoting of the rear wheel about the kingpin axis to steer the vehicle; and an actuator spring connecting the seat and the structural frame and biasing the seat toward a neutral pivot position;

wherein the seat pivot axis is substantially vertical;

wherein at least one of the two front wheels is operably connected to a hand-operable crank above the front wheels for propulsion of the vehicle.

33. A human-powered vehicle comprising:

a structural frame;

two front wheels mounted to fixed axles at a forward portion of the frame for rotation;

a seat secured to the frame, the seat positioned between the front wheels and adapted to pivot about a seat pivot axis;

a steerable rear wheel mounted to the frame behind the seat and defining a rear wheel kingpin axis, the rear wheel operably linked to the seat such that pivoting of the seat about the seat pivot axis causes pivoting the rear wheel about the kingpin axis to steer the vehicle;

wherein the seat is operably connected to the rear wheel by a flexible chain, roller chain or nylon belt;

wherein the chain is trained about a drive sprocket secured to the seat and a driven sprocket secured to the rear wheel steering assembly, the chain being crossed between the drive and the driven sprockets.

34. The vehicle of claim 33 wherein the drive sprocket is disposed on a seat support shaft allowing alignment of the rear wheel relative to the seat position.

* * * * *

UNITED STATES PATENT AND TRADEMARK OFFICE
CERTIFICATE OF CORRECTION

PATENT NO. : 6,902,177 B2
DATED : June 7, 2005
INVENTOR(S) : Stuart M. Lindsay et al.

It is certified that error appears in the above-identified patent and that said Letters Patent is hereby corrected as shown below:

Column 2,
Line 41, "fame" should be -- frame --.

Column 4,
Line 5, "wheels" should be -- wheel --.
Line 62, "improved" should be -- improve --.
Line 63, "vehicles" should be -- vehicle --.

Column 6,
Line 53, after "to", delete "a".
Line 64, after "range", insert -- of steering --.

Column 7,
Lines 15 and 35, "sprocket" should be -- sprockets --.
Line 20, "assembly" should be -- assemblies --.
Line 43, after "denoted", insert -- by the --.

Column 9,
Line 22, "lankage" should be -- linkage --.

Signed and Sealed this

Thirteenth Day of December, 2005

JON W. DUDAS
*Director of the United States Patent and Trademark Office*